US008622257B2

(12) United States Patent
Erman et al.

(10) Patent No.: US 8,622,257 B2
(45) Date of Patent: Jan. 7, 2014

(54) AUGER-DRIVEN POWDER DISPENSER

(75) Inventors: P. Gregory Erman, Head of Chezzetcook (CA); Ben Garvey, Halifax (CA); Chris Marshall, Stillwater (CA); Michael McDougall, Mt. Uniacke (CA); Kevin Stoneman, Fall River (CA); Avery Wilson, Middle Sackville (CA)

(73) Assignee: A.C. Dispensing Equipment, Inc., Lower Sackville, Nova Scotia (CA)

( * ) Notice: Subject to any disclaimer, the term of this patent is extended or adjusted under 35 U.S.C. 154(b) by 589 days.

(21) Appl. No.: 12/446,784

(22) PCT Filed: Oct. 24, 2007

(86) PCT No.: PCT/CA2007/001897
§ 371 (c)(1),
(2), (4) Date: Apr. 23, 2009

(87) PCT Pub. No.: WO2008/049222
PCT Pub. Date: May 2, 2008

(65) Prior Publication Data
US 2010/0065587 A1    Mar. 18, 2010

Related U.S. Application Data

(60) Provisional application No. 60/862,638, filed on Oct. 24, 2006.

(51) Int. Cl.
*G01F 11/24* (2006.01)
*G01F 11/20* (2006.01)

(52) U.S. Cl.
USPC .......... 222/413; 222/1; 222/129.1; 222/129.3

(58) Field of Classification Search
USPC ......... 222/1, 23, 129.1–129.4, 241, 325–327, 222/333, 410–413, 459; 99/290; 239/650, 239/657, 675
See application file for complete search history.

(56) References Cited

U.S. PATENT DOCUMENTS

| 2,800,252 | A | * | 7/1957 | Wahl | ............................... 222/55 |
| 3,671,020 | A | | 6/1972 | Krup | |
| 4,015,780 | A | | 4/1977 | Hall | |

(Continued)

FOREIGN PATENT DOCUMENTS

WO     2004041043     5/2004

OTHER PUBLICATIONS

PCT Patent Application No. PCT/CA2007/001897 Internal Search Report dated Feb. 11, 2008.

*Primary Examiner* — Darren W Gorman
(74) *Attorney, Agent, or Firm* — Shin Hung; Borden Ladner Gervais LLP (57) ABSTRACT

An apparatus for dispensing granulated powder, such as a fine sugar or sweetener, which uses an auger driven by a gear motor. The gear motor is controlled by a control unit on the front of the dispenser, allowing a user to select the quantity of powder to be dispensed. The apparatus comprises at least one, preferably two dispensing assemblies within the chassis, each comprising a storage bin for the powder, an inclined base, an auger member abutting the base of the storage bin and a dispensing chute. The base of the storage bin is inclined positively toward to the orifice of the dispensing chute, thereby ensuring that the powder is dispensed at a constant rate with minimized dribbling.

26 Claims, 10 Drawing Sheets

(56) References Cited

U.S. PATENT DOCUMENTS

| | | |
|---|---|---|
| 4,572,060 A | 2/1986 | Yung-Kuan |
| 4,974,751 A | 12/1990 | King |
| 5,013,499 A * | 5/1991 | Willard .......................... 264/30 |
| 5,217,108 A | 6/1993 | Newnan |
| 5,328,015 A | 7/1994 | Volk, Jr. et al. |
| 5,330,078 A | 7/1994 | Ficken et al. |
| 5,581,982 A * | 12/1996 | Schroeder et al. .............. 53/459 |
| 5,871,619 A | 2/1999 | Finley et al. |
| 5,927,553 A | 7/1999 | Ford |
| 5,952,032 A | 9/1999 | Mordini et al. |
| 5,975,357 A | 11/1999 | Topar |
| 5,980,969 A | 11/1999 | Mordini et al. |
| 6,182,555 B1 | 2/2001 | Scheer et al. |
| 6,969,214 B2 * | 11/2005 | Lichtblau ........................ 404/79 |
| 2006/0071037 A1 * | 4/2006 | Pickrell ........................ 222/413 |

* cited by examiner

AUGER-DRIVEN POWDER DISPENSER

FIELD OF THE INVENTION

The present invention relates generally to dispensing machines for dispensing fine granular substances such as powders. More particularly, the present invention relates to a dispenser apparatus having precise control over small quantities of powder.

BACKGROUND OF THE INVENTION

Automated beverage dispensers have become a commonality in recent years. Food courts, cafeterias, office buildings and community centres name only a few locations where users want freshly brewed drinks but have neither the staffing resources nor the tools and ingredients required to make them. As such, self-contained, automated brewing devices such as those disclosed in U.S. Pat. No. 5,927,553 to Ford and U.S. Pat. No. 6,182,555 to Scheer, et al. are placed in these locations to provide the service that would otherwise be unavailable.

Many of these machines contain dispensers for beverage additives such as sugar or flavouring, allowing users to adapt the dispensed drinks to their individual tastes. Brewing machines often have a plurality of additive dispensers, each of which discharges a pre-determined quantity of additive to be mixed into the beverage before the drink is cupped and released to the customer. It is known from the prior art that the mechanics behind the dispensing of beverage additives often involve a rotating auger member driven by a motor, whereby the auger's action causes a volume of powder to be moved laterally to a discharge port.

Figure 1:
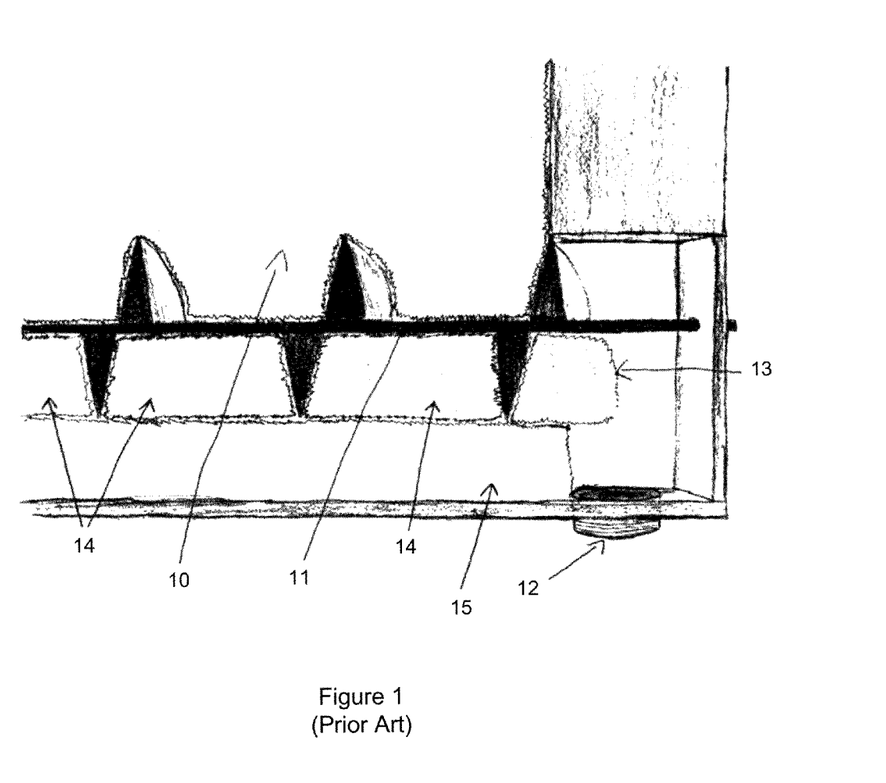
FIG. 1 is an illustration of an auger based powder dispensing apparatus of the prior art.

However, the hopper-and-auger combinations taught by the prior art lead to some difficulties. The first difficulty results from the fact that the hoppers have flat bases. FIG. 1 shows the dispensing port region of a typical auger dispenser taught by the prior art. This often leads the powder to be dispensed at a variable rate. Powder 10, especially that of very fine granules, is prone to settling when left undisturbed for a period of time and consequently forms clumps 14. When one such clump forms in between two blades of an auger 11, it tends to move as a unit once the auger is set in motion. If only part of a clump 13 reaches the dispensing port 12 once the auger stops, it may be partially suspended over the port as there is no substantial force in place to break the clump apart. This can lead to a discrepancy in the expected quantity of powder released, since the clump will either remain suspended by virtue of its integrity causing an insufficient release of additive, or will fall through the port entirely causing an excessive release of additive. This can also cause significant "dribbling" of powder, since any suspended clump may break apart and fall through the port if the machine is jostled while not in use.

An issue contributing to this problem is the orientation of the flight of the auger after the dispense is completed. Those skilled in the art will understand that such augers can be of a conveyor type of auger, such as the one shown in FIG. 8. Most such augers have a helical shaped flight along a length of a shaft with a predetermined pitch. One full revolution of the auger can be calibrated to dispense the powder in a single pitch of the flight. When a full pitch is dispensed, the bottom edge of the flight is substantially positioned adjacent to the opening edge of the port, hence there is little to no non-dispensed powder remaining. However fractions of a revolution, such as a 0.5 revolution will cause dispensing inaccuracy. This is because the non-dispensed powder is positioned between a rear flight edge and the port. Therefore this powder is prone to cascading in an "avalanche" effect if the machine is jostled, which is likely in most service industry environments where such a dispensing machine would be used. This is referred to as a "high-low" effect, because the first dispense operation will provide more than the desired amount of powder, while the next dispense operation will provide less than the desired amount of powder since some of it has been inadvertently dispensed in the first dispense operation.

Furthermore, the augers taught by the prior art often leave a noticeable space between the tips of the blades themselves and the bottom of the hopper. This leads to wasted powder 15, as quantities of the substance may settle to the bottom of the space and remain unused, as it is unreachable by the auger blades. This is both wasteful and unhygienic, as microorganisms can culture in the stagnant substance over time.

An additional difficulty with the hoppers of the prior art is that they are difficult to clean. Because of the nature of the powders dispensed, it is essential that all moisture be removed from the hopper once the cleaning process is complete. A flat-bottomed hopper, however, will not drain fluid unless it is tilted to an awkward angle or allowed to stand upside-down throughout the drying process.

It is, therefore, desirable to provide a dispenser system for fine powders which is easy to clean, efficiently uses all of the powder contained in the hopper and releases powder at a constant rate.

SUMMARY OF THE INVENTION

The present invention is directed to a self-contained powder dispensing system to be placed in any retail outlet which sells beverages capable of receiving additives, to be operated by the retailer's employees or by the customer. The system dispenses granulated powders using auger members turned by driving motors responsive to a user's request.

In a first aspect, the present invention provides an apparatus for dispensing a powder. The apparatus includes a removable hopper for storing the powder, an auger, and a motor unit coupled to the auger. The hopper stores the powder, and has an inclined bottom section and a dispensing outlet in communication with the inclined bottom section. The auger is rotatable in the inclined bottom section of the hopper. The motor unit rotates the auger for moving the powder in an upward direction along the inclined bottom section towards the dispensing outlet as the auger is rotated. According to embodiments of the present aspect, the auger includes a flight terminating proximate to an edge of the dispensing outlet, and the inclined bottom section is angled at approximately 18 degrees. Furthermore, the inclined bottom section defines a U-shaped cross-section for cradling the auger, and the inclined bottom section of the auger includes a drain hole sealed with a removable plug. A breaking means can be connected to a vertex of the dispensing outlet.

According to an embodiment of the present aspect, the motor unit includes a first mating part and the auger includes a second mating part, where the second mating part releasably mates to the first mating part. Preferably, the first mating part and the second mating part are self-aligning with respect to each other. In a further embodiment, the motor unit includes a motor, and the apparatus further includes a control unit for controlling the motor. The control unit controls the motor to rotate the auger in a first direction for dispensing the powder, and for rotating the auger in a second direction for withdrawing non-dispensed powder from the dispensing outlet after the auger is rotated in the first direction.

In the present embodiment, the control unit includes a user interface for receiving inputs from a user; a processor in communication with the user interface, the processor for executing a control algorithm in accordance with the inputs from the user to obtain a driving signal; and a motor driver in communication with the processor and with the motor. The motor driver receives the driving signal from the processor and controls the motor in accordance with the driving signal. The motor can be either a stepper motor or a gear motor. The processor is a programmable processor having a non-volatile memory, the non-volatile memory storing the control algorithm, and the user inputs include a powder dose. The user interface includes a display for displaying options to the user, where the display is a liquid crystal display and the user interface includes button actuators.

In a second aspect, the present invention provides an apparatus for dispensing a powder. The apparatus includes a control unit and a dispensing unit. The control unit receives an electrical selection signal corresponding to a dispense volume and generates a corresponding driving signal. The dispensing unit has a hopper for storing the powder, and an auger positioned along an inclined bottom section for dispensing the powder through a dispensing outlet in response to the driving signal. According to an embodiment, the dispensing unit further includes a motor coupled to the auger for rotating the auger in a first direction and moving the powder in an upward direction along the inclined bottom section towards the dispensing outlet in response to the driving signal. The auger is rotated in a second direction opposite to the first direction for withdrawing non-dispensed powder away from the dispensing outlet after the auger is rotated in the first direction.

According to embodiments of the present aspect, the auger includes a flight terminating proximate to an edge of the dispensing outlet and the inclined bottom section is angled at approximately 18 degrees. In a further embodiment, the control unit includes a user interface, a processor and a motor driver. The user interface provides the input command in response to a user selection. The processor is in communication with the user interface, and executes a control algorithm corresponding to the input command for generating the driving signal. The motor driver is in communication with the processor and with the motor, and controls the motor in response to the driving signal.

In a third aspect, the present invention provides a method for dispensing a powder from a dispensing unit. The method includes receiving a user selection signal corresponding to a dispense volume; moving a predetermined amount of the powder corresponding to the dispense volume up an inclined base towards a dispensing outlet in response to the user selection signal; and, withdrawing non-dispensed powder from the dispensing outlet after the predetermined amount of the powder is dispensed. According to an embodiment of the present aspect, the step of moving includes rotating an auger in a first direction for moving the predetermined amount of the powder, and the auger has a flight terminating proximate to an edge of the dispensing outlet. In a further embodiment, the step of withdrawing includes rotating the auger in a second direction opposite to the first direction by a predetermined number of rotational degrees. Alternately, the auger is rotated in a second direction opposite to the first direction until a bottom edge of a flight of the auger is substantially adjacent to a vertex of the dispensing outlet.

It will be appreciated by one skilled in the art that other dispensing units or stacks of multiple units may be added to either side of the first unit or stack of units without departing from the scope of the present invention.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The embodiments of present invention are directed to an apparatus for dispensing granulated powder, such as a fine sugar or sweetener, which uses an auger driven by a gear motor. The gear motor is controlled by a control unit on the front of the dispenser, allowing a user to select the quantity of powder to be dispensed. The apparatus comprises at least one, preferably two dispensing assemblies within the chassis, each comprising a storage bin for the powder, an inclined base, an auger member abutting the base of the storage bin and a dispensing chute. The base of the storage bin is inclined positively toward to the orifice of the dispensing chute, thereby ensuring that the powder is dispensed at a constant rate with minimal dribbling due to gravity. Dribbling of powder is further minimized by backdriving, or reversing the auger member such that any non-dispensed powder is withdrawn from the orifice. The arrangement of the auger member abutting the inclined base of the storage bin prevents the powder from accumulating at the bottom of the bin and forming clumps.

The powder dispensing apparatus according to one embodiment includes a chassis made of stainless steel or any other durable material. The chassis comprises a control unit on the front of the chassis, allowing a user to select the type and quantity of powder to be dispensed. The chassis further comprises a receptacle in which a customer can place a cup or other container for receiving powder dispensed from the system. In one embodiment of the invention, the chassis surrounds the entire system to prevent a customer from accessing the interior of the system and also for preventing contamination.

The interior of the chassis comprises at least one removable dispensing unit, each of which contains a single powdered substance. In one embodiment, one of the dispensing units is recessed so as to be in proximity with a chute for guiding powder dispensed from the unit into the receptacle. The interior of the chassis is easily accessible for maintenance, cleaning or replacing the dispensing units. Contained within the chassis are a number of driving motors, for example stepper motors or DC Gear motors with accompanying encoder, each of which engages an auger.

The dispensing unit is removable from the chassis for cleaning, maintenance or refilling. When inserted into the chassis, the driving motor interface engages one gear motor such that the torque provided by the motor turns the auger member and moves the powder toward the dispensing port. The base of the storage bin is inclined upwards toward the orifice of the dispensing port, thereby ensuring that the powder is dispensed at a constant rate with no dribbling. With the addition of an optional drainage hole and removable plug at the bottom of the incline, the inclined base allows for easy cleaning through flushing the unit with an appropriate cleaning solvent. The auger assembly is easily removable without tools to further facilitate the cleaning process. Further, the arrangement of the auger member abutting the inclined base of the storage bin prevents the powder from accumulating at the bottom of the bin and remaining unused. Once the unit is inserted into the chassis and the cover is closed, the port is directly above the chute of the chassis. As a result, any powder dispensed is guided through the chute and falls to the receptacle without any loss of powder.

The control unit may be placed into a maintenance mode whereby a technician or employee of the retailer may program the control unit to interpret the user's input differently. For example, one "serving" of sweetener may correspond to 1 gram of sucrose, but only 50 mg of saccharine. If a dispensing unit contains sucrose, the user's request for one serving of sweetener must be interpreted by the control unit in such a way that it instructs the sucrose dispensing unit to dispense the requisite 1 gram. Later, if the sucrose in the hopper in replaced with saccharine, the control unit would have to be reprogrammed to instruct the dispensing unit to dispense only 50 mg.

Figure 2:
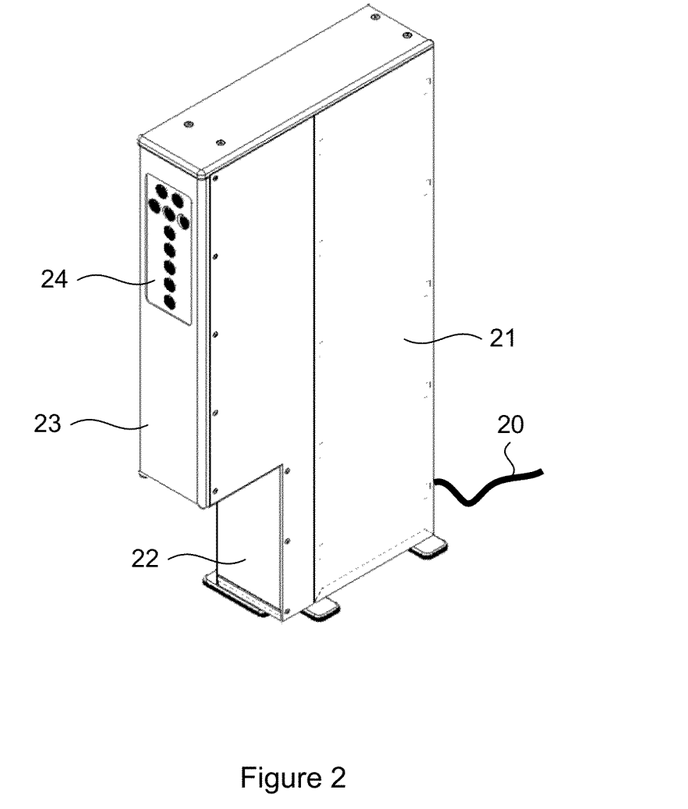
FIG. 2 shows a powder dispensing system, according to an embodiment of the invention.

FIG. 2 is an isometric view of the chassis 21 of the powder dispensing system according to an embodiment of the present invention. A control panel 24 allows a user to select the kind and quantity of powder to be dispensed. Once a selection is made, the machine dispenses the user's selection into a recess 22, into which the user can place a cup, bowl, or other vessel to receive the dispensed powder. The amount dispensed need not be limited to a quantity appropriate for a single serving of a drink. A person skilled in the art will appreciate that this invention may be used in cases where larger quantities of powder are required to fill a vessel such as, for example, a sugar bowl to be placed on a table in a restaurant.

In this embodiment, the front panel 23 is a hinged door whereby a user can access the interior of the chassis assembly for maintenance, cleaning, or refilling purposes. Alternatively, the door may clip on through tab members, may slide into place along a track or may be attached through any other nonpermanent fastening means. In addition, alternate embodiments allow access to the interior of the chassis through removable side, top or back panels of the chassis 21. A power cord 20 for a standard 110V AC outlet supplies electric power for the machine's operation. Of course, as will be understood by the skilled worker, any other suitable sources of electrical power can be used.

Figure 3:
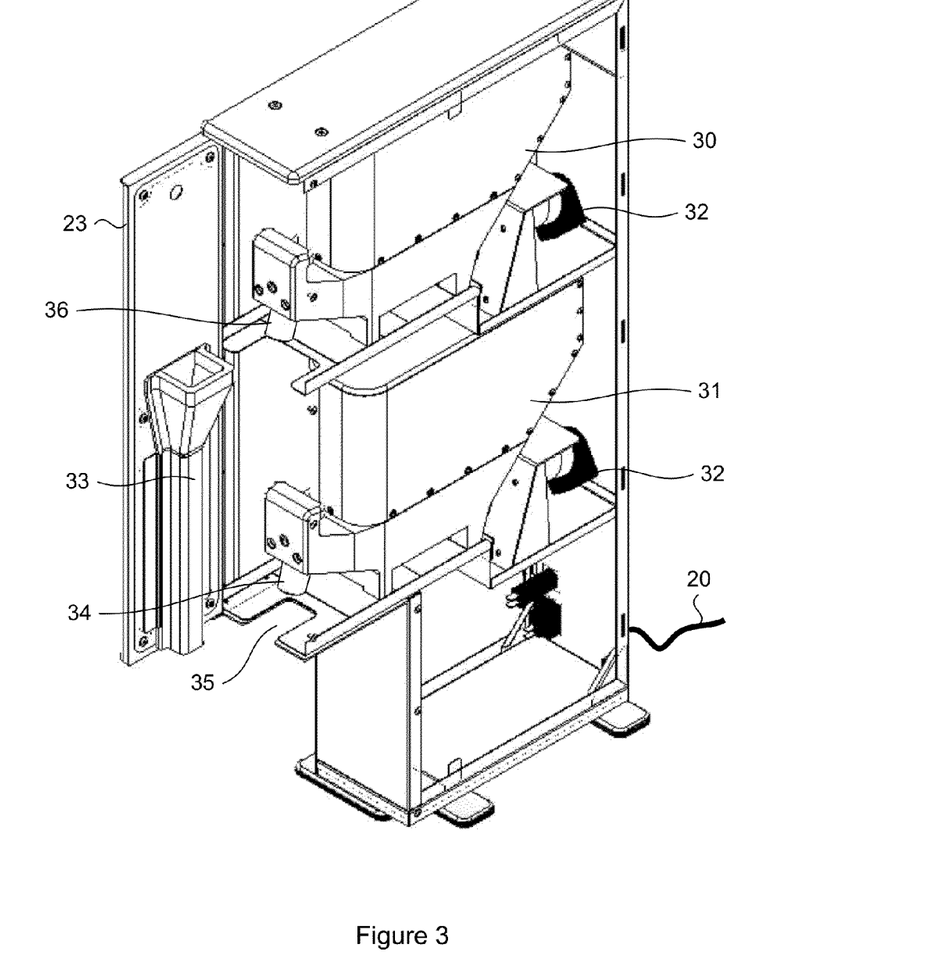
FIG. 3 is a view of the interior of the powder dispensing system of FIG. 2 with the access door in the open position.

FIG. 3 shows the inside of the chassis assembly with the front panel 23 in the open position and a sidewall of the chassis removed. The powder dispensing system includes two dispensing units 30 and 31, each of which can contain a separate powder. When the front panel 23 is in the open position, the dispensing units are removable from the chassis for cleaning, maintenance or refilling. For example, the upper unit 30 can contain granular sucrose while the lower unit 31 can contain a powdered non-dairy creamer. When the front panel 23 is in the closed position, a chute member 33 is positioned under the dispensing port 36 of the upper unit 30. This ensures that any powder dispensed from the upper unit 30 is guided to the opening 35 and is not spilled into the interior of the chassis. Note that in this exemplary embodiment, the lower unit 31 is slightly further to the back of the chassis interior that the upper unit 30 is. This prevents the lower unit 31 from interfering with the chute member 33. Because of the placement of lower unit 31 immediately above the opening 35, which opens on the recess 22 (shown at FIG. 2), powder dispensed from its dispensing port 34 does not require an additional chute member for guidance to the recess 22.

However, to further prevent cross contamination, overspray, wastage or mess, the front panel can optionally include a second chute member (not shown) positioned under the dispensing port 34. Therefore, the two chute members will precisely channel the powder to a very finite location. The inside of the chassis assembly further comprises driving motors 32, which interface with the dispensing units. According to FIG. 3, both units 30 and 31 are in their operable positions and are releasably connectable to the driving motors 32. While one skilled in the art will appreciate that the driving motors can be any motors capable of providing a torque, this embodiment of the invention comprises gear motors equipped with encoders due to the high precision control they provide. Those skilled in the art will appreciate that stepper motors can be used with equal effectiveness.

Figure 4:
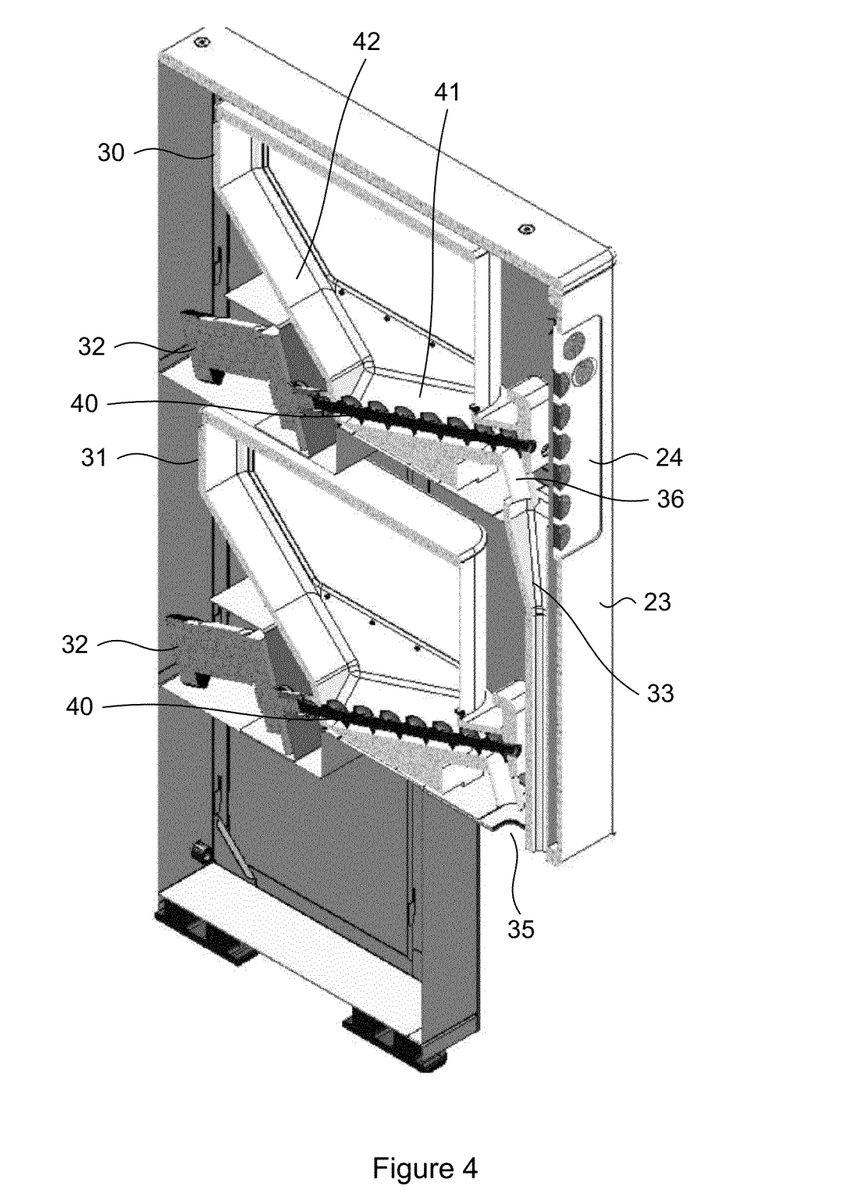
FIG. 4 is a cross-sectional view of the powder dispensing system of FIG. 2.

FIG. 4 shows an angled cross-sectional view of the embodiment of the invention of FIG. 3. In this image, the front panel 23 is in the closed position, and both dispensing units engage their respective gear motors 32. In one embodiment of the invention, the driving motor interface can comprise a rectangular prism-shaped member (not shown) and the gear motor can have a correspondingly shaped recess (not shown) sized to receive the prism-shaped member. The prism-shaped member itself can be beveled so that it will slide into position in the recess. In other words, if the prism member and stepper motor are out of rotational phase, the edge of the recess coming into contact with the smooth bevel will force the prism-shaped member and attached auger member to rotate in phase with the recess as the unit is slid into position. Those skilled in the art will understand that any other suitable mating scheme can be used. Note that the chute member 33 is in registry with the upper and lower unit's dispensing ports 36 and 34. The base 41 of each unit is tapered in such a way as to form a U-shaped trough for cradling the auger member 40. This serves to channel any powder in the unit to the auger member, thereby preventing powder from settling on the base itself and remaining unused. The rear wall 42 is angled to channel powder toward the auger member 40. The gear motor 32 provides a torque, which turns the auger member 40, thereby pushing some of the contents of the dispensing unit along the base 41 toward the dispensing port 36 of the unit.

Figure 5:
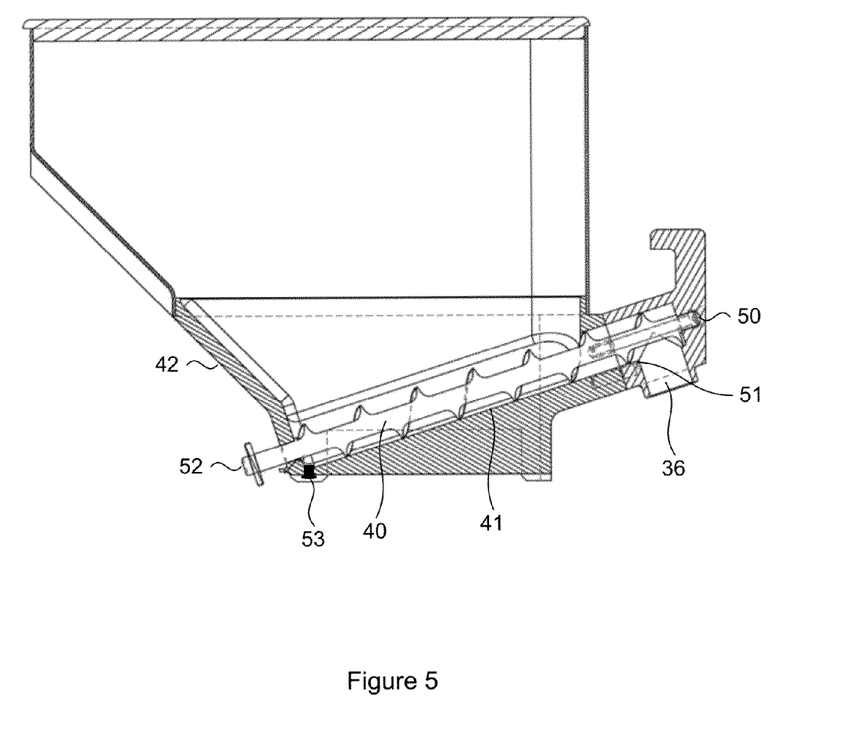
FIG. 5 is a profile cross-sectional view of one dispensing unit according to an embodiment of the invention.

FIG. 5 shows a profile cross-sectional view of one dispensing unit according to an embodiment of the invention. The unit comprises an auger member 40, which is driven by a gear motor 32 (not shown) through a driving motor interface 52 at the rear of the unit, and a pivot-point socket 50 at the front of the unit to hold it in place. Note that the blades of the auger member abut the base 41, which prevents powder from settling at the bottom of the unit.

Figure 6:
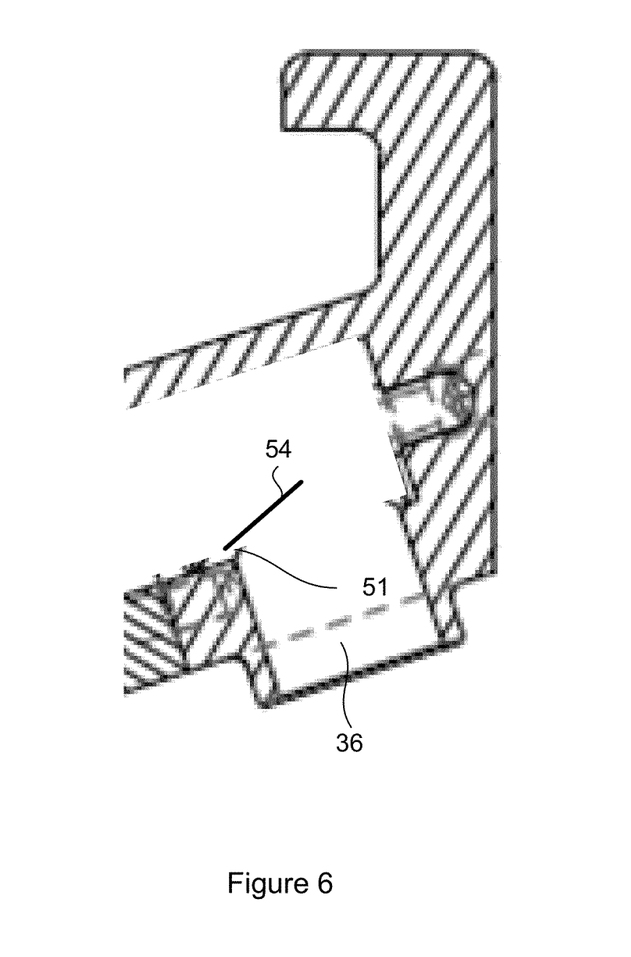
FIG. 6 is an enlarged view of the dispensing unit of FIG. 5.
Figure 7:
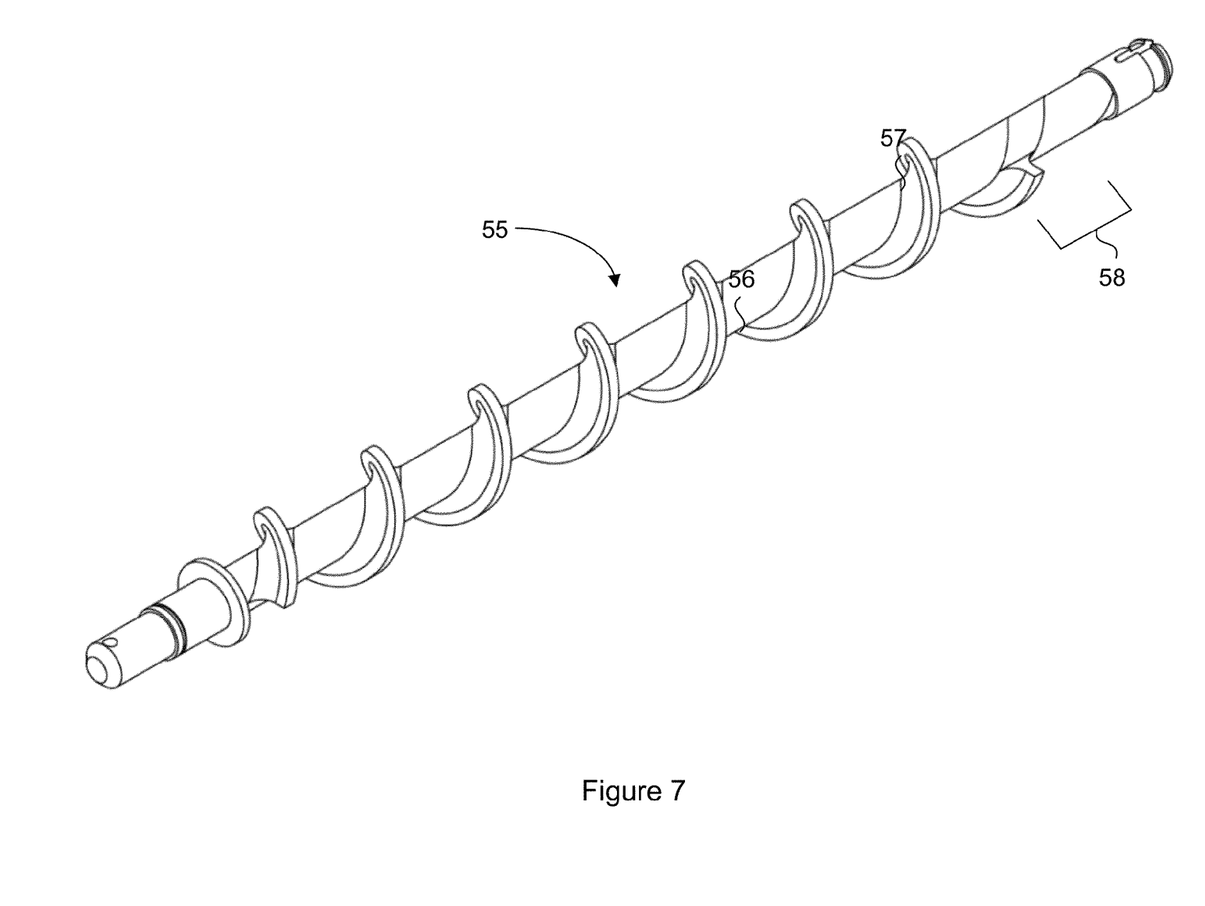
FIG. 7 is an isometric view of a flight reduced auger member usable in the dispensing unit of FIGS. 2 to 6.

The base 41 of each unit is inclined positively toward the dispensing port 36. Experimentation has found that an 18 degree incline is sufficient for preventing most powder materials from cascading through the dispensing port 36 after the auger member 40 has stopped rotating. It is noted that the inclined angle can be varied depending on the powder characteristic (granularity for example) and the physical characteristics of the auger member 40 (flight size and pitch for example). The angled incline allows gravity to retain powder to the back end of the auger member, more specifically the flight. Because the powder will naturally tend to settle toward the back of the unit due to this incline, it will not spill out of the dispensing port if the machine is jostled. As such, the vertex 51 formed between the inclined base 41 and the rear wall of the dispensing port 36 acts as a baffle to prevent spillage of powder. Furthermore, the vertex 51 can include resilient tines (not shown) extending from the vertex 51 for engaging the blades of the auger member 40. Any clumps of powder can be broken up as they are pressed against the resilient tines. FIG. 6 is an enlarged view of the dispensing port 36 of FIG. 5, to illustrate the position of the tines 54. The auger 40 is not shown in order to clearly show tines 54. Any number of tines 54 can be used, where the spacing, length and resilience can be selected to optimize breaking ability and longevity. Tines 54 are considered one implementation of breaking means for breaking clumps of powder, and any other type of mechanism effective for breaking clumps of powder can be used.

In an alternate embodiment of the invention, each unit can comprise a drain hole sealed with a removable plug member 53 at the lowermost point of the base 41 to allow for channeled drainage along the inclined base. The removable plug member 53 can be constructed of a rubber material, and sized to seal the drain hole. The presence of the tapered walls described above, along with the inclined base 41 and the declined rear base 42 serves to channel any solvent added to the unit toward the plug member 53. As such, cleaning any residual powder from the unit can be easily done by flushing the unit with water.

Figure 8:
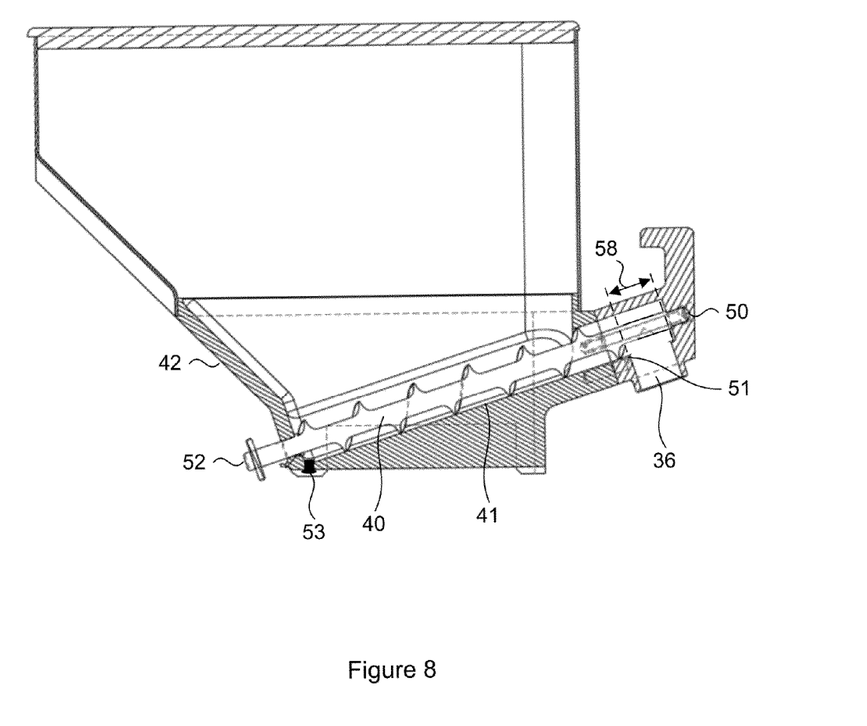
FIG. 8 is a profile cross-sectional view of one dispensing unit having an installed flight reduced auger member.

While the incline of the base 41 will mitigate unnecessary spillage of the powder material, it has been discovered that when the flight continues past the dispensing port 36, it allows the product through static or inertial adhesion to travel beyond the vertex 51 of of the dispensing port 36 without a clean break off point. Some or all of the non-dispensed powder may fall through dispensing port 36. Therefore, according to another alternate embodiment of the invention, the flight of auger member 40 can be modified to minimize the potential for non-dispensed powder to cascade into the dispensing port 36 when the auger member is rotated by fractions of a flight. More specifically the flight of the auger member 40 is modified such that the flight terminates at or just before reaching the dispensing port 36. FIG. 8 is an isometric view of a flight reduced auger member 55, having a shaft 56 and a flight 57. The flight 57 is omitted from region 58, which corresponds to the area occupied by dispensing port 36 when flight reduced auger member 55 is installed in the dispensing unit.

FIG. 8 shows a profile cross-sectional view of one dispensing unit having the flight reduced auger member 55 installed therein. Apart from flight reduced auger member 55, all the elements of FIG. 8 have been previously shown in FIG. 5. When installed in the dispensing unit, region 58, which is flight-free, will be positioned over the dispensing port 36. More importantly, the end of the flight terminates at approximately the left-most edge of dispensing port 36. Accordingly, there will be less dispersion of powder after a dispense.

Figure 9:
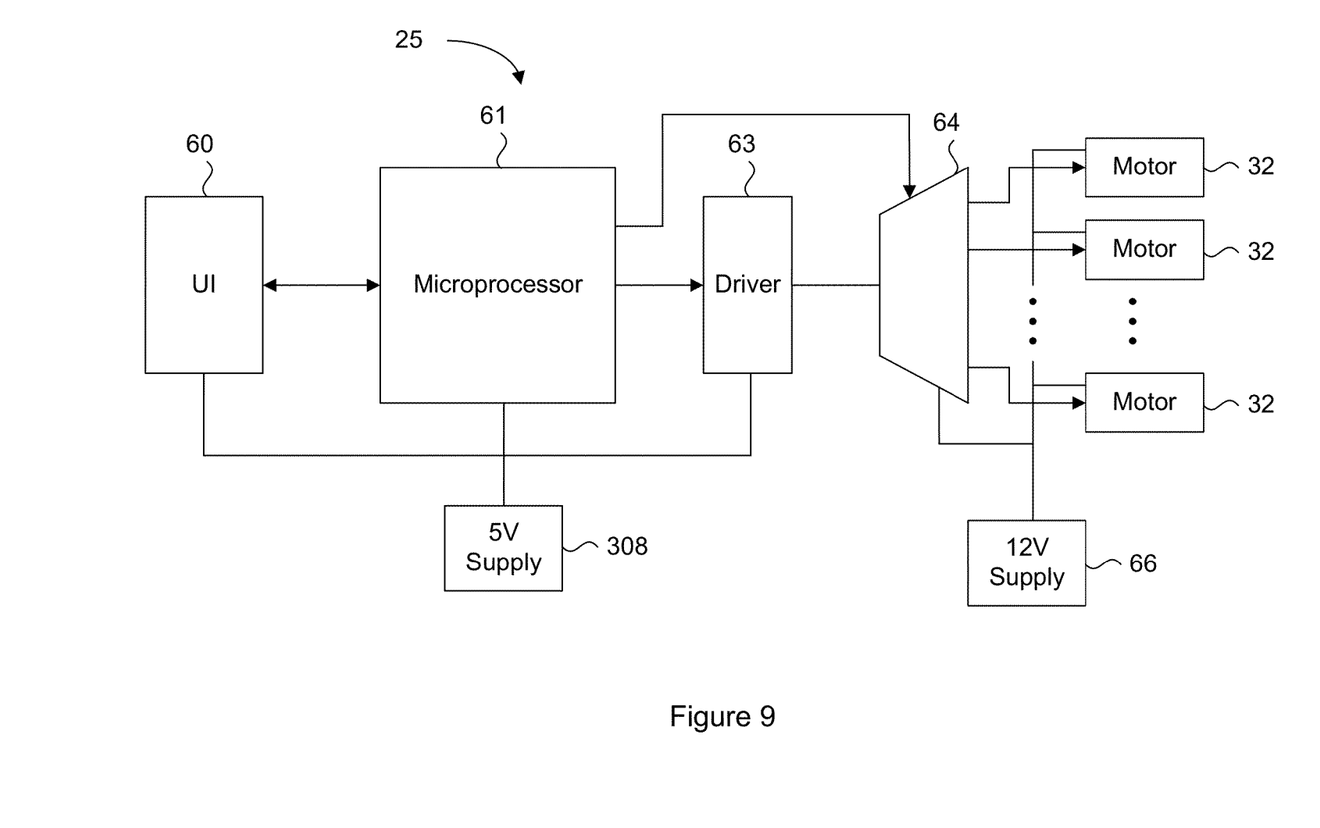
FIG. 9 is a block diagram showing the electrical system of the powder dispensing system, according to an embodiment of the invention.

One of ordinary skill in the art will appreciate that the electronics involved in the operation of this system may take a variety of embodiments. The following is but one example of such an embodiment. FIG. 9 is a block diagram representing the functional components of an embodiment of the invention. A control unit 25 includes a user interface 60, a microprocessor 61, an auger driver 63, a relay system 64, a gear motor 32, a 5 volt power supply 62 and a 12 volt power supply 66.

User interface 60 includes button actuators of the capacitive or piezoelectric sensor type, for sending electrical selection signals to microprocessor 61, and a liquid crystal display (LCD) driver circuitry for receiving predetermined display data from microprocessor 61. The button actuators can be disposed on the control panel 24 shown at FIG. 2. The LCD driver circuitry drives an LCD display with alphanumeric characters for providing user feedback. Of course, any other suitable type of display can be used.

Microprocessor 61 can be programmable to permit the manufacturer to install pre-set control algorithms and auger control data for all valid selection combinations. An example of a suitable microprocessor is the Motorola MC68HC908AB32 with non-volatile Flash memory. Microprocessor 61 receives the electrical selection signals from the user interface 60 for accessing the programmed auger calibration data and calculating the necessary volume to dispense. Once calculated, microprocessor 61 can issue corresponding auger control data also referred to as a driving signal, which can include the specific driving motor 32 to be actuated and the quantity of powder to be dispensed from its corresponding dispensing unit.

The programmability of microprocessor 61 also permits tracking of remaining powder in the dispensing units coupled to each stepper motor 32. Since the volume of each dispense is known, and the full level volume of the dispensing unit hopper is known, the microprocessor can store a current remaining volume of powder so that a visual and/or audio alert is emitted once a predetermined empty level threshold is reached. Of course, a low level indication can be provided when the remaining volume of powder has reached a predetermined level. This alert can signal the user to refill the dispensing unit, and optionally locks out the specific powder from being dispensed.

Auger driver 63 is the circuit responsible for actuating one stepper motor 32. More specifically, auger driver 63 provides motor drive signals, such as direction of rotation and step signals to turn gear motor 32. Accordingly, the number of pre-calibrated steps corresponds to the desired quantity of powder to be dispensed. The auger driver 63 can control gear motor 32 to rotate in the opposite direction to withdraw any residual or non-dispensed powder from the vertex 51, thereby further preventing powder from accidental dispensing after the gear motor 32 has stopped rotating. This is referred to as a backdrive function, which can be executed after each dispense operation. The rotational degrees to backdrive can depend on the powder, incline angle of the base 41 and physical characteristics of the auger member 40. The next dispense operation will compensate for the previous backdrive to ensure that the correct amount of powder is dispensed. To ensure that there is minimum spillage, or dispersion of powder after a dispense, the auger member 40 can be backdriven such that the bottom edge of the flight is substantially adjacent the vertex 51 of dispensing port 36. This is shown in FIG. 5 by example, where the orientation of the flight after backdriving effectively seals the non-dispensed powder in the previous pitch from dispensing port 36. Therefore, in combination with the inclined base 41, repeatable accurate dispenses can be obtained.

Relay system 64 multiplexes the direction of rotation and step data from the auger driver 63 to one of the gear motors 32. Practically, the relay system 64 includes a set of individual relay devices, each individually selectable by microprocessor 61 for coupling the data to the corresponding gear motor 32. The present control unit 25 shows a single auger driver 63 shared among two or more different gear motors 32. This configuration reduces costs since each driver 63 is relatively expensive. Hence, in a combination dispenser where multiple powders are to be dispensed, each selected gear motor 32 is actuated sequentially. Alternatively, control unit 24 can include one auger driver 63 dedicated to a corresponding gear motor 32 for simultaneous actuation of multiple gear motors.

In one embodiment of the invention, the control unit 25 may be placed into a "maintenance mode" by a member of the retail outlet staff or technician. This maintenance mode will allow the technician to program the volume of powder that should correspond to a user's request. For example, the lower unit contains granular sucrose and the upper unit contains a powdered non-dairy creamer. A typical single serving of sucrose for a cup of coffee is 5 ml. As such, a user's request for one serving of sugar should result in the system's dispensing of that same amount. If the embodiment of the invention in question dispenses powder at a rate of 2 ml per second, it will take 2.5 seconds to dispense one serving of sucrose. By placing the control unit in maintenance mode, a technician can program/calibrate the unit to dispense for the predetermined period of time or for the predetermined number of steps.

Using a gear motor with encoder in this manner has the added advantage of precision programming, since it allows for programming in discreet numbers of steps. Other motors use time-based calibration, requiring a user to calculate fractions of a second to finely-tune the amount of powder to be dispensed.

In summary, several previously described features can be used to minimize the amount of dispersion of powder after a dispense operation has terminated, for maximizing repeatability of accurate dispenses. First is the incline of base 41, second is the use of a flight reduced auger member 55, and third is a control system to backdrive an auger member after a dispense operation. Each of these features can be used independently of each other to obtain improved dispersion control over prior art powder dispensing units. Of course, two or more of these features can be used in combination with each other to realize further improved powder dispersion control. For example, maximum powder dispersion prevention is attained when all three features are used together.

Figure 10A:
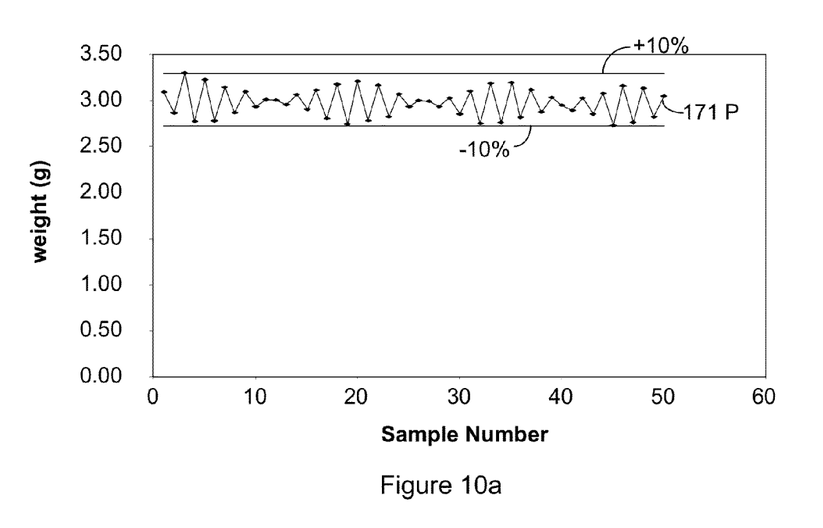
FIG. 10a is a plot of dispensed powder using the dispensing unit of FIG. 5; and, FIG. 10b is a plot of dispensed powder using the dispensing unit of FIG. 8.
Figure 10B:
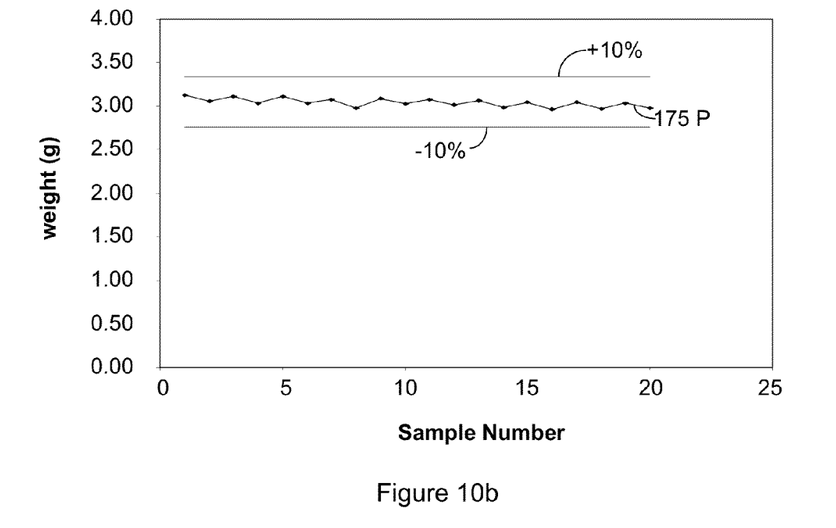

The impact of combining these specific features is illustrated in the graphs of FIGS. 10*a* and 10*b*, which show experimental data from repeated dispense operations using a full flighted auger member 40 as used in the embodiment of FIG. 5, and a flight reduced auger member 55 as used in the embodiment of FIG. 8. FIG. 10*a* is a plot of the measured amount of a dispensed powder on the y-axis for a plurality of dispense operations on the x-axis, for the dispensing unit of FIG. 5 with no backdrive operation. Therefore, the inclined base is the only powder dispersion control feature being implemented. In the present example, a desired three gram dispense is repeated 50 times, and the actual measured amount is measured each time. As shown in FIG. 10*a*, there is a maximum variance of about 10% between the smallest dispense versus the highest dispense for any given three gram dispense operation, and the averaged dispense over the 50 dispense operations is about 2.9 grams. The horizontal lines are the +/−10% variance markers. The largest dispense is about 3.3 grams while the smallest dispense is about 2.7 grams, which is an improvement over prior dispense units that do not have an inclined base. The "oscillation" of dispense amounts is the previously described "high-low" effect due to the orientation of the flight after a dispense operation, since the extra dispensed powder due to dispersion in one operation will not be available for a subsequent dispense operation. Hence the next three gram dispense will be less than the desired amount.

FIG. 10*b* is a plot of the measured amount of a dispensed powder on the y-axis for a plurality of dispense operations on the x-axis, for the dispensing unit of FIG. 8. The dispensing unit of FIG. 8 uses the flight reduced auger member 55, which is controlled to include the previously described backdrive operation. Hence, all three powder dispersion control features are implemented. In the present example, a desired three gram dispense is repeated 50 times, and the actual measured amount is measured each time. As shown in FIG. 10*b*, there is a maximum variance of about 3% between the smallest dispense versus the highest dispense for any given three gram dispense operation, and the averaged dispense over the 50 dispense operations is about 3.04 grams. The horizontal lines are the +/−10% variance markers. The largest dispense is about 3.14 grams while the smallest dispense is about 2.93 grams, which is an improvement over both prior dispense units and the dispense unit of FIG. 5. While the previously described "high-low" effect is still present, it is significantly reduced relative to the dispense operations of FIG. 10*a*. As evidenced by the data shown in FIG. 10*b*, all dispenses are substantially constant, and very close to the desired three-gram dispense.

Another problem that can be addressed by the present invention is that related to dispensing a small amount of powder immediately after having dispensed a large amount of powder or, conversely, dispensing a large amount of powder after having dispensed a small amount of powder. In such cases, the amount of powder dispensed can depend on the previously dispensed amount. This is known as the carryover effect. For example, a 1 g dispense following a 5 g dispense could result in a 1.3 g dispense, and a 5 g dispense following a 1 g dispense could result in a 4.6 g dispense. The carryover effect occurring upon dispensing a powder amount "B" after having dispensed a powder amount "A" can be mitigated by, in a calibration procedure, measuring the dispensed amount of powder and comparing it to the nominal, or desired, dispense amount "B". Adjustments to the amount of rotation of the auger 40 can then be made to ensure that the measured dispensed amount of powder is within a pre-determined acceptable range from the nominal dispense amount "B". By characterizing the powder dispensing apparatus (the auger rotation) in this manner for all possible combination of successive dispense amounts of different nominal values, it is possible to create a lookup table indicating the required amount of auger rotation required to dispense an amount "B" after having dispensed an amount "A". The lookup table can be programmed into the memory of the microprocessor 61 and called-upon by the microprocessor when required.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An apparatus for dispensing a powder, the apparatus comprising:
a removable hopper for storing the powder, the removable hopper having an inclined bottom section and a dispensing outlet in communication with the inclined bottom section, the inclined bottom section having a vertex adjacent to the dispensing outlet;
an auger rotatable in the inclined bottom section of the removable hopper and having a flight with an edge abutting the inclined bottom section for moving received powder in a pitch of the flight in an upward direction along the inclined bottom section towards the dispensing outlet;
a motor unit coupled to the auger for rotating the auger to dispense the received powder in the pitch of the flight through the dispensing outlet, and to align the edge with the vertex for preventing non-dispensed powder of a following pitch of the flight from spilling over the vertex.

2. The apparatus of claim 1 wherein the inclined bottom section is angled at approximately 18 degrees.

3. The apparatus of claim 1 wherein the inclined bottom section defines a U-shaped cross-section for cradling the auger.

4. The apparatus of claim 1 wherein the inclined bottom section of the removable hopper includes a drain hole sealed with a removable plug.

5. The apparatus of claim 1 wherein the inclined bottom section includes breaking means connected to the vertex of the dispensing outlet.

6. The apparatus of claim 1 wherein the motor unit includes a first mating part and the auger includes a second mating part, the second mating part for releasably mating to the first mating part.

7. The apparatus of claim 6 wherein the first mating part and the second mating part are self-aligning with respect to each other.

8. The apparatus of claim 1 wherein the motor unit includes a motor, the apparatus further comprising a control unit for controlling the motor.

9. The apparatus of claim 8 wherein the control unit controls the motor to rotate the auger in a first direction for dispensing the powder, and for rotating the auger in a second direction for withdrawing the non-dispensed powder from the dispensing outlet after the auger is rotated in the first direction.

10. The apparatus of claim 8 wherein the control unit includes:
a user interface for receiving inputs from a user;
a processor in communication with the user interface, the processor for executing a control algorithm in response to the inputs from the user to obtain a driving signal; and
a motor driver in communication with the processor and with the motor, the motor driver for receiving the driving signal from the processor and for controlling the motor in response to the driving signal.

11. The apparatus of claim 10 wherein the motor is a stepper motor.

12. The apparatus of claim 10 wherein the motor is a gear motor.

13. The apparatus of claim 10 wherein the processor is a programmable processor having a non-volatile memory, the non-volatile memory for storing the control algorithm.

14. The apparatus of claim 13 wherein the non-volatile memory is also for storing a lookup table characterizing a required rotation amount of the auger for a desired dispense amount.

15. The apparatus of claim 10 wherein the user inputs include a powder dose.

16. The apparatus of claim 10 wherein the user interface includes a display for displaying options to the user.

17. The apparatus of claim 16 wherein the display is a liquid crystal display.

18. The apparatus of claim 10 wherein the user interface includes button actuators.

19. An apparatus for dispensing a powder, comprising:
a control unit for receiving an electrical selection signal corresponding to a dispense volume and generating a corresponding driving signal; and,
a dispensing unit having a removable hopper for storing the powder, and an auger including a flight with an edge abutting an inclined bottom section and rotatable for dispensing received powder within a pitch of the flight over a vertex of a dispensing outlet in response to the driving signal, the auger being further rotatable to align the edge with the vertex for preventing non-dispensed powder in a following pitch of the flight from spilling over the vertex.

20. The apparatus of claim 19, wherein the dispensing unit further includes a motor coupled to the auger for rotating the auger in a first direction and moving the powder in an upward direction along the inclined bottom section towards the dispensing outlet in response to the driving signal, the auger being rotated in a second direction opposite to the first direction for withdrawing the non-dispensed powder away from the dispensing outlet after the auger is rotated in the first direction.

21. The apparatus of claim 20, wherein the control unit includes
a user interface for providing the input command in response to a user selection,
a processor in communication with the user interface, the processor executing a control algorithm corresponding to the input command for generating the driving signal, and a motor driver in communication with the processor and with the motor, the motor driver controlling the motor in response to the driving signal.

22. The apparatus of claim 19, wherein the inclined bottom section is angled at approximately 18 degrees.

23. A method for dispensing a powder from a dispensing unit, comprising:
receiving a user selection signal corresponding to a dispense volume;
moving a predetermined amount of the powder corresponding to the dispense volume up an inclined base of a removable hopper towards and over a vertex of a dispensing outlet in response to the user selection signal by rotating an auger having a flight with an edge abutting the inclined base, the predetermined amount of the powder corresponding to received powder in a pitch of the flight; and,
withdrawing non-dispensed powder from the dispensing outlet after the predetermined amount of the powder is dispensed and aligning the edge of the flight with the vertex for preventing the non-dispensed powder in a following pitch of the flight from spilling over the vertex.

24. The method of claim 23, wherein the step of moving includes rotating the auger in a first direction for moving the predetermined amount of the powder.

25. The method of claim 24, wherein the step of withdrawing includes rotating the auger in a second direction opposite to the first direction by a predetermined number of rotational degrees.

26. The method of claim 24, wherein the step of withdrawing includes rotating the auger in a second direction opposite to the first direction until a bottom edge of the flight of the auger is substantially adjacent to the vertex of the dispensing outlet.

* * * * *